Patented July 21, 1925.

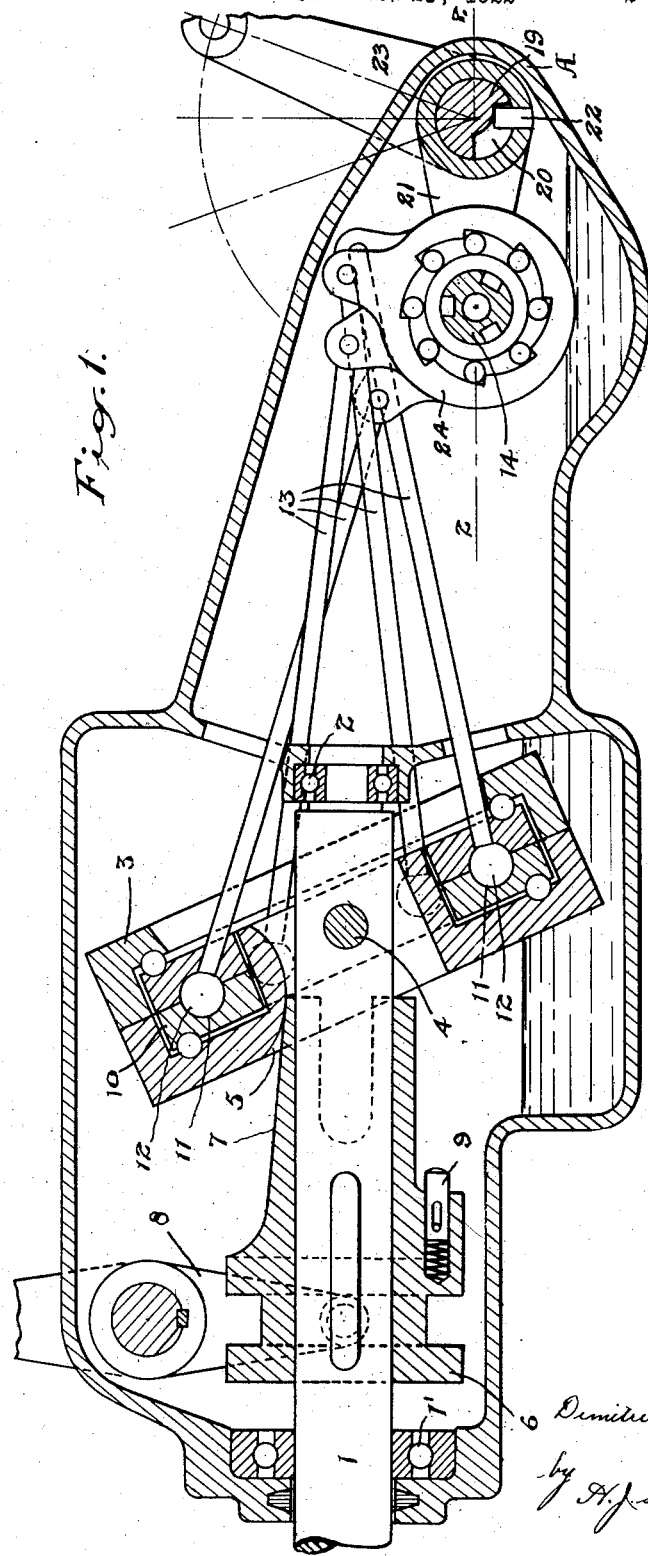

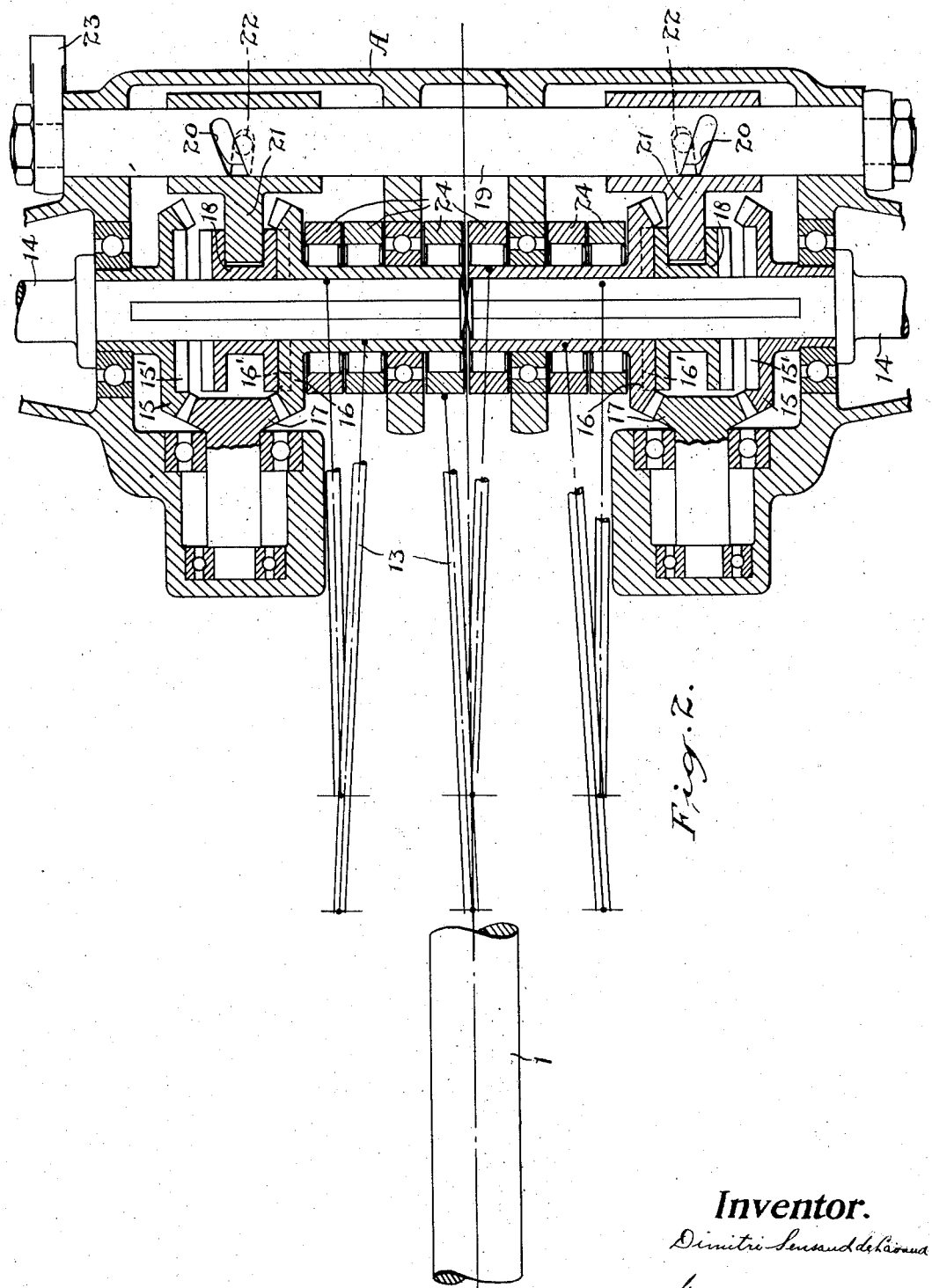

1,546,826

UNITED STATES PATENT OFFICE.

DIMITRI SENSAUD DE LAVAUD, OF PARIS, FRANCE.

VARIABLE-POWER TRANSMISSION.

Application filed January 28, 1922. Serial No. 532,462.

*To all whom it may concern:*

Be it known that I, DIMITRI SENSAUD DE LAVAUD, a citizen of the United States of Brazil, and resident of the city of Paris, in the Republic of France, have invented certain new and useful Improvements in a Variable-Power Transmission, described in the following specification and illustrated in the accompanying drawings, that form part of the same.

The principal objects of the invention are, to eliminate the objectionable features in the changing of gear ratios in power driven mechanisms and to devise a mechanism which will have an extremely flexible range and will retain a constant mechanical connection between the driving and driven members.

The principal feature of the invention consists in the arrangement of a plurality of clutch members to rotate the driven shaft and imparting intermittent movement to said clutches by means of individual connecting rods connected at various points in the circumference of an oscillating member operated by the driving shaft, and whereby the throw of the oscillating member is regulated by effecting a change in the angularity of the axis in relation to the axis of the driving shaft.

A further important feature consists in the novel manner of reversing the driven shaft.

In the drawings, Figure 1 is a longitudinal vertical mid-section of the transmission.

Figure 2 is a partial horizontal section of the driven shaft and its co-related mechanism taken on the line 2—2 of Figure 1.

In the construction herein illustrated the driving shaft 1 is mounted in bearings 1' and 2 and a circular casing 3 encircles said shaft and is pivotally mounted in trunnions 4 extending transversely from said shaft.

The inner perimeter of the casing 3 is formed with an involute cam surface 5 arranged on the diameter opposite to the diameter of the trunnions.

A sleeve 6 slidably keyed on the shaft 1 is formed with a tapering surface 7 which engages the cam surface 5 and regulates the angle of inclination of the axis of the cam 5. The sleeve is operated longitudinally by a forked lever 8. A spring plunger 9 is arranged in the sleeve 6 to push against the casing 3 to move it to an inclined position to start it oscillating.

Within the casing 3 a ring 10 is mounted on antifriction bearings and at equally spaced distances said ring is formed with spherical sockets 11 in which the ball ends 12 of the rods 13 are held.

The driven shaft 14 is journalled transversely of the casing and for motor car construction is formed in two halves. A pair of bevel gears 15 and 16 are rotatably mounted on the shaft 14 and are formed with sleeve extensions supported in suitable ball bearings in the case A. A pinion 17 is mounted to mesh with the gears 15 and 16. Each of the gears 15 and 16 is provided with a clutch face 15' and 16' and a sleeve clutch 18 is slidably keyed on the shaft 14 between said gears and is adapted to connect either gear with the shaft to drive it in either direction. The sleeve clutches 18 are operated by a shaft 19 which is journalled transversely of the casing A and is provided with oppositely disposed spiral grooves 20 formed in its outer periphery.

Forked members 21 are loosely mounted on the shaft 19 and are provided with pins 22 projecting into the grooves 20.

A crank 23 is rigidly connected to one end of the shaft 19 and by its operation said shaft 19 is rotated to bring the spiral grooves 20 into different positions.

The changing of the spiral grooves 20 operates upon the pins 22 and shifts the fork members 21 on the shaft 19 thereby shifting the sleeve clutches on the shaft 14.

A plurality of roller ratchet clutch rings 24 loosely encircle the sleeve ends of the gears 16 and the forward turning of said rings imparts a forward turning movement to the gears which in turn communicate the motion to the shaft either direct through the clutch sleeve or reverse through the medium of the pinions.

The clutch rings 24 are each connected on the top side to one of the rods 13 and a back and forth movement is imparted to said rods as the ring 10 is oscillated by the rotation of the casing 3.

It will be seen that if the axis of rotation of the casing 3 coincides with the axis of the driving shaft it will have no oscillation and there will be no movement of the rods 13. The slightest inclination of the axis of rotation of casing 3 will cause it to oscillate and through the ring 10 the rods 13 will reciprocate and rotate the clutch rings 24 back and forth and as the angle of oscillation is varied so will the distance of travel of the rods vary. The oscillating movement of the ring 10 operates the rods 13 in an effective movement successively so that the clutch rings operate in a continuous succession thus translating the intermittent reciprocal action into a continuous rotative movement.

The mechanics involved in this invention are simple but they produce an extraordinary effect for at a given speed of the driving shaft the power may be transmitted in a succession of vibrations or impulses of varying length according to the angularity of the oscillating member, consequently as the length of the vibrations is lessened the speed is reduced but the power is increased. It is therefore obvious that the range of speed and power change extends from zero up to the maximum angle of inclination of the oscillating member and there will be no interruption of the connection between the driving and driven member.

The construction herein shown is of simple design but the invention is capable of development and many changes in construction may be made without departing from the principal elements.

What I claim as my invention is:—

1. A power transmission, comprising the combination with a driving member and a plurality of ratchet clutches operated thereby, of a pair of driven shafts axially aligned, a sleeve rotatably mounted on each of said driven shafts and driven by said clutches, means adapted to operatively connect said sleeves to rotate said shafts with the sleeves, and means adapted to co-operate with said sleeves to rotate the shafts in a reverse direction to said sleeves.

2. In a power transmission for motor vehicles, the combination with the driving shaft and a divided driven shaft, of sleeve members rotatably mounted on said driven shafts, gears fixed to the outer ends of said sleeves, gears fixed to the outer ends of said driven shafts, movable clutches operating between said sleeve and shaft gears, means for operating said clutches in unison, reversing pinions arranged between said sleeve and shaft gears, ratchet clutch members operatively arranged on each of said sleeves, an oscillating member operated by the driving shaft, and a plurality of links connected one with each of said ratchet clutch members and all being connected with said oscillating member.

3. In a power transmission for motor vehicles, the combination with a driving shaft and a divided driven shaft, of driving means connecting the members of the driven shaft independently with the driving shaft, reversing clutches arranged on each portion of said driven shaft, a shaft arranged parallel with the divided driven member having oppositely arranged spiral grooves cut therein, sleeves slidably arranged on said shaft and connected with said sliding clutch members and having pin projections engaging said spiral grooves.

DIMITRI SENSAUD DE LAVAUD.